Dec. 26, 1967     E. F. KURZINSKI ET AL     3,360,384
PRODUCTION OF FROZEN FOODSTUFFS
Filed June 20, 1963
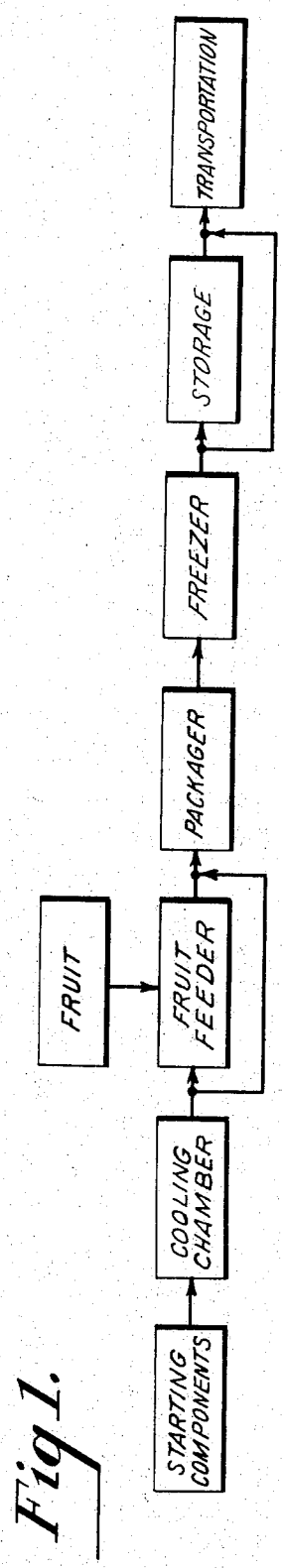
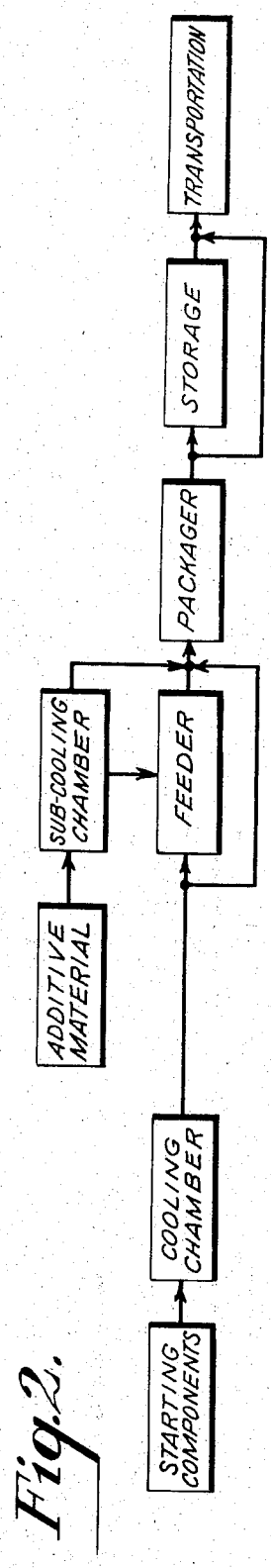
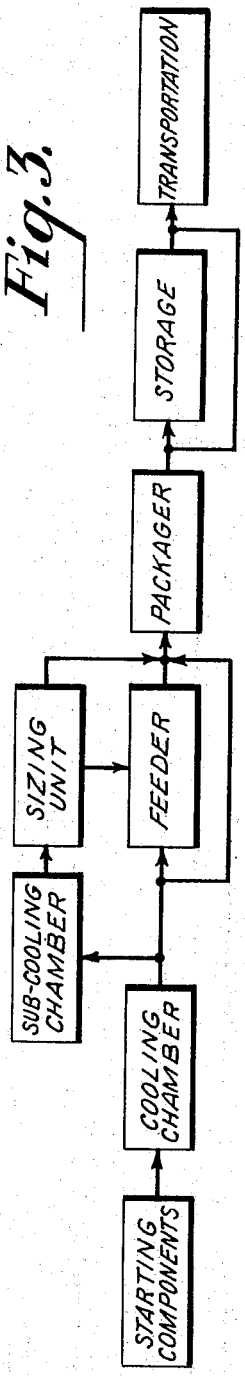
INVENTORS.
Edward J. Kelly &
Edward F. Kurzinski
ATTORNEY.

United States Patent Office 3,360,384
Patented Dec. 26, 1967

3,360,384
PRODUCTION OF FROZEN FOODSTUFFS
Edward F. Kurzinski, Allentown, and Edward J. Kelly, Schuylkill Haven, Pa., assignors to Air Products and Chemicals, Inc., Philadelphia, Pa., a corporation of Delaware
Filed June 20, 1963, Ser. No. 289,186
24 Claims. (Cl. 99—192)

This invention relates to a process for the controlled chilling of foodstuffs through the addition of an edible coolant.

While the invention is broadly applicable to the rapid and efficient chilling of such dissimilar foods as fruit concentrates, puddings, pie fillings and soups, the present process is particularly suited for the production of frozen desserts such as ice cream, ice milk, sherbet, mellorine-type frozen desserts and water ices. For convenience, the instant invention will be described with reference to the production of ice cream.

In the conventional ice cream process, as illustrated by the schematic drawing of FIGURE 1, ice cream components are fed to an ice cream cooling chamber such as a freezer where they are mixed and refrigerated to about 22±2° F. At the same time, air is incorporated into the mixture. Ice cream is discharged as a viscous semifluid from the cooling chamber and passed to a fruit feeder where fruit and/or other ingredients from a separate hopper are added to the ice cream. Of course, in non-fruited ice cream, the fruit feeder is not used and may be bypassed. The ice cream, with or without the added fruit, is then sent to a packager where in the normal operation ice cream flows into cartons. These cartons may be conveyed to a blast freezer where typically they are held for an hour in a −40° F. blast. By longer blast freezing, additional hardening in a cold storage area can be bypassed. Normally, however, the ice cream is passed from the blast freezer to a storage room which is maintained at about −20° F. and the newly packaged ice cream is held there to permit the ice cream to harden in the cartons. After hardening, the cartons are removed from the storage room to transportation such as refrigerated railroad cars and trucks.

In the described conventional operation, it is common practice in the production of fruit ice creams to start with a frozen fruit, thaw and drain the fruit, and meter the drained material into the main stream of ice cream through the fruit feeder. Thawed fruit material, however, warms the ice cream with which it is blended, thus increasing the refrigeration requirements during hardening. Even in those instances where a non-fruited ice cream is made, refrigeration problems have occurred.

Rapid chilling of the outer layer of ice cream through contact with a cryogenic liquid or gas has caused undesirable shrinkage of product away from the package wall. In addition, processes as heretofore practiced have often necessitated an over-cooling of outer layers in order to obtain the desired temperature effect in the inner portion of the product.

These and other problems have been overcome by the process of the present invention which is illustrated by FIGURES 2 and 3. The process of the present invention is essentially one of refrigerating to a low temperature a mass of material and adding the resultant low-temperature or subcooled material as a ribbon or in pieces at a controlled rate into ice cream during the filling operation or at some point or points during the passage of the ice cream from the cooling chamber into the final container. The low temperature material may consist of ice cream, fruit, or any other ingredient or combination of ingredients of the final ice cream product. Typical non-fruit additives include chocolates, fudge, coffee concentrates, etc. The acceleration of cooling rate which results, can be utilized to give either improved product quality, higher product throughout or both.

The present invention, illustrated schematically in FIGURE 2 is similar to the conventional process illustrated by FIGURE 1. Ice cream components are fed to a freezer or cooling chamber which operates in the same manner as the cooling chamber of FIGURE 1 except that the temperature of the ice cream discharged therefrom may be as high as 27° or 28° F., but preferably no higher than 26° F. Fruit, or other ice cream additions, enters a subcooling chamber which is refrigerated with liquid nitrogen or other cryogenic refrigerant to a temperature below −100° F. and preferably below −150° F. As used herein, the term cryogenic refrigerant means a refrigerant fluid having a normal liquefaction or solidification point below minus 100° F. After subcooling, if any subdivision is desired, the subcooled material is passed through a jaw crusher or other sizing unit (not shown) before said material is passed to the feeder. The feeder may be identical with the fruit feeder conventionally employed (as shown by FIG. 1) or may be one specially designed for use with the subcooled material. The feeder may serve a secondary function by accomplishing the desired subdivision of subcooled material and thereby eliminate the need for a special sizing unit. Ice cream, containing the added subcooled material, is discharged to the packager and then passed to storage or to transportation. It has been found that as distinguished from the −20° F. temperature customarily employed for hardening, the temperature of the storage room in the practice of the instant invention may be as high as 0° F. Nevertheless, regardless of processing conditions, the colder the storage temperature, the better the ice cream.

If the percentage of subcooled material is sufficiently high, the final product may alternatively be extruded as a stiff, non-flowing material. The shape and size of extruded portions of final product may be controlled by use of appropriate extrusion heads to fit individual product requirements. For example, material having the container shape may be extruded, cut to the proper length and pressed into the desired container. A non-rigid type of packaging material may be used to package or wrap the extruded product since the product is capable of holding its shape without the aid of container walls. This alternative procedure, i.e., extrusion procedure, also permits novel shapes to be formed for use at parties and similar purposes.

FIGURE 3 is a schematic illustration of the present invention as used wherein a portion of the ice cream is used as the subcooled material. The process is similar to that shown in FIGURE 2 with the exception that a controlled portion of the ice cream from the cooling chamber is by-passed to a subcooling chamber or cryogenic unit where the ice cream is subcooled in the manner of the process of FIGURE 2 and formed into pieces having the desired size and shape. If further subdivision is necessary, the material is next passed through a sizing unit before the pieces of the subcooled ice cream are incorporated into the main stream of ice cream in a feeder. Packaging, storage, etc., are identical with the operation of the process shown by FIGURE 2.

The percentage of the additive which is passed through the subcooling chamber may be varied within wide limits. It has been found that 3 to 60%, and preferably 10 to 25%, of subcooled material is sufficient to cause substantial increases in the rate of freezing. Percentages of subcooled material ranging from 25 to 40% are sufficient to harden a conventionally processed ice cream without the need for additional refrigeration from a freezer or hardening room, thus making it possible to go directly from the packaging line to a refrigerated carrier.

Preparation of the low-temperature material in the process illustrated by FIGURE 2 or 3 is accomplished by either direct or indirect contact between the material and a cryogenic refrigerant. Two examples of suitable cryogenic refrigerant are liquid nitrogen and cold nitrogen vapor released from a body of liquid nitrogen. The early stages of refrigeration in the preparation of the low-temperature material, however, may be carried out by means other than a cryogenic refrigerant. For example, ice cream may be partially hardened by the conventional ice cream process and then exposed to a cryogenic refrigerant for subcooling.

In determining the relative merit of various cryogenic refrigerant for the purpose of subcooling added material, important criteria are: (1) capability of subcooling the material to the desired low temperature level, (2) ease and speed of subcooling material, (3) cost of the cryogenic refrigerant in relation to its B.t.u.-absorbing capacity and (4) possible residual side effects in the final product, related to organoleptic quality and/or toxicity.

Liquid nitrogen and other cryogenic liquids and gases have previously been used for refrigerating the final ice cream product by several techniques. These include bath-type immersion vessels and/or heat-exchange chambers such as tunnels. The advantages of the present invention over previous methods involving cryogenic refrigerants are:

(1) Refrigeration is supplied from within the ice cream product, thus distributing the entire cooling effect evenly throughout the product rather than the outer layer, necessitating an over-cooling of the outer layers to obtain the desired temperature effect in the inner portion of the product.

(2) By supplying refrigeration from within the ice cream product, more rapid temperature reduction throughout the product is obtained. Thus, the time lag involved in heat transfer by conduction outward from the inner portion of the product is eliminated. This advantage increases in importance with increasing package size because the time lag problem inherent in other cryogenic (and non-cryogenic) hardening processes becomes significantly greater as package size increases.

(3) A too rapid chilling of the outer layer of ice cream through contact with a cryogenic liquid or gas can cause undesirable shrinkage of product away from the package wall. This problem does not exist in the practice of the present invention.

The terms "hardening" and "hardening rate" are commonly used in the ice cream industry to describe the application of refrigeration to the product after it emerges from an ice cream freezer and is packaged. During hardening, the freezing process begun in the ice cream freezer is continued, with further lowering of temperature, ice crystallization and other physical changes. The present process accelerates the rate of heat removal during ice cream hardening. The resultant more rapid rate of ice crystallization yields a greater proportion of small crystals, which gives improvements in texture and in other ice cream quality attributes.

It is to be understood that blast tunnels, plate freezers and other equipment designed for rapid hardening can be used, if desired, in conjunction with the instant process. Further acceleration of the rate of heat removal from the packaged product may thereby be achieved before transfer to a hardening or low-temperature storage room. Notwithstanding, the present process may be utilized without additional refrigeration equipment to either harden ice cream more rapidly than the customary rate or to increase hardening room capacity at existent hardening rates by hardening more packages per unit time at the customary rate. Both objects may be achieved simultaneously, but to a lesser degree, since the two factors are inversely related.

The acceleration of hardening rate resulting from the process illustrated by FIGURES 2 and 3 is highly flexible and controllable with respect to the total amount of refrigeration added and as to whether its major effect takes place before or after packaging. In using the process, it is generally desirable to delay the major cooling effect until after the ice cream is packaged in order to prevent excessive stiffening before packaging and consequent pumping and packaging difficulties. There are several ways in which this can be accomplished. One is through the use of relatively larger particles of subcooled material. Another is by shortening the pre-packaging contact time between subcooled material and the main stream of ice cream; this requires use of a shorter pipeline or a smaller diameter pipe between the point of addition of subcooled material and the point of packaging. Lowering the percentage of subcooled material also can result in a decreased rate of stiffening, but the overall temperature drop would then also be lessened. Other ways in which product stiffness prior to packaging may be reduced are by omitting or reducing insulation on pipelines and equipment and by allowing the subcooled material to warm up prior to incorporation into the main stream of ice cream. Both of these latter two techniques are wasteful from the standpoint of cooling efficiency of the subcooled material and are suitable only as temporary expedients.

When greater than usual stiffness of product is desired prior to packaging, as for example, when a non-rigid type of package is to be used and the ice cream must retain its shape without the aid of container walls, the same factors described in the preceding paragraph can be used to accomplish the opposite effect. For example, time in pipeline should be lengthened rather than shortened.

As previously mentioned, it is possible to operate at a higher drawing temperature from the freezer since the addition of subcooled material rapidly compensates for the lesser amount of refrigeration provided during passage through the freezer. The higher drawing temperature favors increased production capacity for the ice cream freezer and the added subcooled material insures that the rate of ice crystal formation is not adversely affected. With the addition of a sufficiently large quantity of subcooled material, ice cream at relatively high drawing temperature can be hardened even more rapidly than one that is drawn at a lower temperature but hardened without the use of an internal coolant. Dairy plants commonly furnish refrigeration to ice cream freezers and to other dairy plant equipment such as coolers and hardening rooms from a common source. The lessened refrigeration requirement of the ice cream freezer may be reflected in greater refrigeration capacity for refrigeration units other than the ice cream freezers. If an overall increase in ice cream production rate is not desired, the higher production rate per freezer allows one or more freezers in a multi-freezer operation to be shut down without reducing overall production rate. Labor, power, and other operating costs are thereby reduced.

In addition to the above-mentioned improvements in quality and/or production economies, the defined process also makes possible the manufacture of ice cream possessing one or more additional novel features. One example of this is the improved quality in the final product of a "seeded" subcooled fruit such as strawberry. Maceration of fruit that takes place in a fruit feeder under usual commercial conditions is eliminated by the present process, giving improved retention of original appearance, texture and flavor of the fruit. In addition, quality of fruit is improved due to reduction in size of ice crystals within the fruit at completion of hardening.

Another feature of the defined process is the flexibility and control of size, shape, and distribution of added subcooled material such as fruit or other ice cream ingredient. Because of their solidity and brittleness at cryogenic temperatures, fruit, ice cream, and other ingredients to be used for "seeding" can be broken up to obtain the desired particle size and shape by crushing, grinding or fracturing by other means. A means of obtaining the desired size and shape of subcooled material is by passing the material through a die or through some other shaping equipment such as a pelletizer or mold, and rapidly freezing the material so as to solidify it in the desired shape and size. The merit of each of these methods will depend in part upon the consistency and other physical properties of the material to be subcooled.

Moreover, portions of low temperature materials may be used which, if added at a higher temperature, diffuse and lose their desirable structural integrity. Juices, purees, concentrates, syrups and other fluid materials can be solidified and subcooled, and then added to the ice cream in the form of discrete pieces. Highly acidic material such as citrus products can be incorporated into the ice cream by this means without the destabilizing effect that results from their addition by conventional ice cream processing methods.

The invention is further clarified by reference to the following examples.

*Example I*

Ice cream was allowed to soften to approximately 28° F. Frozen strawberries, purchased for the run, were thawed prior to immersion in liquid nitrogen. Sugar syrups derived from the berries during thawing were discarded. The berries were held at −320° F. until they were stirred into the ice cream at a level equivalent to approximately 12 percent (by weight) of the final product.

It was found by comparing the time-temperature relationship for replicate samples containing 12 percent subcooled berries with a control sample containing the same percentage of thawed berries that the temperature differential was close to the theoretical maximum, calculated on the basis of B.t.u. transfer. Appearance and taste of the berries within the hardened ice cream samples were excellent.

*Example II*

In tests similar to Example I which were carried out under commercial ice cream plant conditions, taste analyses indicated that the rapid hardening gave better body and texture to the final ice cream product. An apparent increase in richness was also evident.

Pipeline freeze-up was prevented by careful regulation of the percentage of added subcooled material and shortening the pipeline length. It was found, however, that at higher than normal freezer discharge temperatures (approximately 24 to 25° F.), pipeline freeze-ups did not present a problem even at a relatively high level of addition of subcooled material (approximately 20%, based on the weight of the final product).

*Example III*

In taste tests where ice cream, rather than fruit, was subcooled, disintegrated and blended back into a 22° F. ice cream stream, uniformity of appearance and taste of the final product were excellent. Added particles could not be recognized as such in the finished ice cream.

*Example IV*

Quality tests were made next and compared with moderately fast conventional hardening facilities. These tests indicated both an improved initial quality and an additional benefit with respect to resistance to heat shock.

Replicate tests were made with viz, a half-gallon control sample and two half-gallon samples containing 5 and 10%, respectively, of subcooled ice cream. The internal temperature of each half-gallon sample was continuously measured. Although all three samples reached 0° F. at approximately the same time, the samples containing the added subcooled ice cream had more rapid initial hardening and had a significant improvement in quality as shown by Table 1.

TABLE 1

| Sample | Treatment Level | Average Score |
|---|---|---|
| A | Control | 90 |
| B | 5% | 93 |
| C | 10% | 95 |

[1] Based on body and texture only; perfect score=100.

Apart from the frozen foodstuffs previously mentioned, viz, desserts, fruit concentrates (e.g., orange concentrates), pie fillings, soups, etc., even non-fluid products may, in some instances, be chilled or frozen by the same basic technique of blending a percentage of subcooled edible material into the product. For instance, the present invention provides a method for the desirable rapid freezing of ground beef which discolors when frozen too slowly.

Obviously, many modifications and variations of the invention as hereinbefore set forth may be made without departing from the spirit and scope thereof, and therefore only such limitations should be imposed as are indicated in the appended claims.

What is claimed is:

1. A method of increasing the freezing rate and improving the quality of an edible frozen product comprising the steps of:
    (a) forming a predetermined first quantity of an edible material subcooled by heat exchange with a cryogenic refrigerant to a temperature below minus 100° F.,
    (b) forming a predetermined second quantity of an edible material in a fluent condition at a predetermined temperature substantially warmer than said subcooled first quantity,
    (c) combining said first and second quantities of edible material to form a mixture wherein said subcooled material is in substantially uniform heat exchange relationship with said second quantity of edible material, said predetermined first and second quantities and the temperatures thereof being selected such that said subcooled first quantity provides a substantial portion of the refrigeration necessary to freeze the final product.

2. The method as claimed in claim 1 wherein said second quantity of edible material is precooled to a predetermined temperature approaching or slightly below the incipient freezing temperature thereof.

3. The method as claimed in claim 1 wherein said first quantity of edible material is subcooled to a temperature in the order of minus 200 to minus 320° F.

4. The method as claimed in claim 1 further including the step of extruding the combined first and second quantities of edible material.

5. The method as claimed in claim 1 wherein the proportions and temperatures of said first and second quantities are such that the combination thereof becomes stiff without additional refrigeration.

6. The method as claimed in claim 1 wherein the proportions and temperatures of said first and second quantities are such that the combination thereof freezes to the degree desired of the final product without additional refrigeration.

7. The method as claimed in claim 1 wherein said first quantity of edible material comprises 3 to 60 percent of the combined quantities.

8. The method as claimed in claim 1 wherein said first quantity of edible material comprises 5 to 25 percent of the combined quantities.

9. The method as claimed in claim 1 wherein said first quantity of edible material is formed as discrete subcooled particles.

10. The method as claimed in claim 9 wherein said discrete subcooled particles are blended into said second quantity of edible material.

11. The method as claimed in claim 1 wherein said first quantity of edible material is precooled by a first refrigerant prior to heat exchange with said cryogenic refrigerant.

12. The method as claimed in claim 1 wherein said first and second quantities of edible material are of the same composition.

13. The method as claimed in claim 12 wherein an initial quantity of edible material is formed and is subsequently divided to form said first and second quantities of edible material.

14. The method as claimed in claim 1 wherein said first quantity of edible material is a flavoring material.

15. The method as claimed in claim 1 wherein second quantity of edible material is an ice cream mix.

16. The method as claimed in claim 1 wherein said second quantity of material is ice cream mix precooled to a temperature below 29° F.

17. The method as claimed in claim 1 wherein said first quantity of edible material is an unmacerated fruit.

18. The method as claimed in claim 1 wherein said first quantity of edible material is selected from the group consisting of juices, purees, concentrates, and syrups.

19. The method as claimed in claim 1 wherein said first quantity of edible material is selected from the group consisting of citrus fruits and the juices thereof.

20. The method as claimed in claim 1 wherein one of said first and second quantities of edible material comprises a normally solid material in particulate form.

21. The method as claimed in claim 1 wherein said second quantity of edible material is selected from the group consisting of concentrates, puddings, pie fillings, soups, ice cream, ice milk, sherbet, mellorine desserts, water ices, and ground meats.

22. The method as claimed in claim 1 further including the step of immediately packaging said combined quantities such that the majority of the heat exchange therebetween takes place after being packaged.

23. The method as claimed in claim 1 further including the step of packaging said combined quantities after the heat exchange therebetween produces a stiff, nonfluent state of the product.

24. The method as claimed in claim 1 wherein Step (a) comprises forming a plurality of individual pellets of said first-recited edible material followed by subcooling said pellets in heat exchange with said cryogenic refrigerant.

References Cited
UNITED STATES PATENTS

| | | | |
|---|---|---|---|
| 3,246,993 | 4/1966 | Webster et al. | 99—192 |
| 1,729,893 | 10/1929 | Oliver | 99—192 |
| 2,080,920 | 5/1937 | Ingalls | 99—136 XR |

A. LOUIS MONACELL, *Primary Examiner.*

R. S. AULL, M. VOET, *Assistant Examiners.*